May 5, 1964

A. H. WILDVANK ETAL 3,132,014

GAS PURIFYING ARRANGEMENT

Filed May 5, 1961

GEORGE A. BRONSON
ARTHUR H. WILDVANK
INVENTORS.

BY *Jerry A. Dinardo*
*George C. Thompson*
Agents

May 5, 1964 A. H. WILDVANK ETAL 3,132,014
GAS PURIFYING ARRANGEMENT
Filed May 5, 1961 2 Sheets-Sheet 2
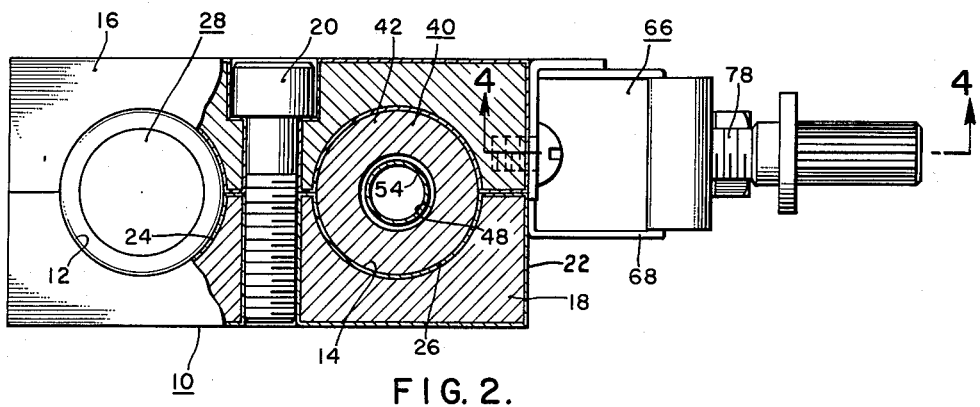
FIG. 2.
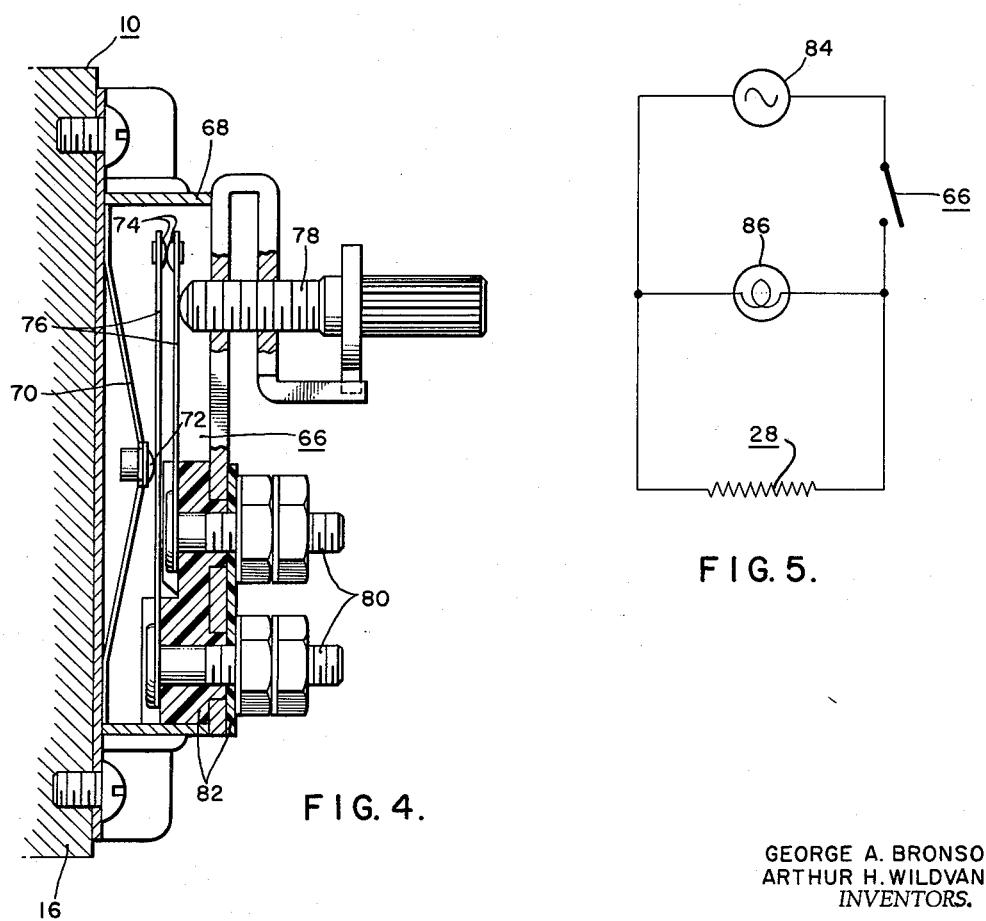
FIG. 4.
FIG. 5.
GEORGE A. BRONSON
ARTHUR H. WILDVANK
INVENTORS.
BY Jerry A. Dinardo
George C. Thompson
Agents

United States Patent Office 3,132,014
Patented May 5, 1964

3,132,014
GAS PURIFYING ARRANGEMENT
Arthur H. Wildvank, Torrance, and George A. Bronson, Lynwood, Calif., assignors to Space Technology Laboratories, Inc., Los Angeles, Calif., a corporation of Delaware
Filed May 5, 1961, Ser. No. 107,955
2 Claims. (Cl. 55—158)

This invention relates to a gas purifying arrangement and particularly to an improved device for removing gaseous impurities from hydrogen gas.

It is known that palladium metal and certain alloys thereof, when they are heated to a predetermined temperature, become selective filters for hydrogen gas. For example, hydrogen gas will diffuse through the pores of palladium metal or a silver alloy of palladium heated to about 600° F. while other gases will not pass through the metal. While there are known devices which make use of the selective filtering properties of palladium, these devices lack certain desirable features, such as compactness and easy replaceability of parts. Generally, when the filter element needs replacement, it is necessary to replace other parts which are not worn, or even entire assemblies.

Accordingly, an object of this invention is to provide a gas purifying arrangement, particularly for purifying a gas purifying arrangement, particularly for purifying hydrogen gas, that is characterized by its simplicity in construction, its compactness, and its relative ease of parts replacement.

It is a further object to provide a gas purifying device containing a filter element which can easily be replaced without the need for replacing other parts.

The foregoing and other objects are realized in a gas purifying arrangement in which a filter unit and a heating unit are mounted, in spaced apart relation and thermally coupled to each other, in cavities of a thermally conducting mounting block. Both the filter and heating units are easily and separately replaceable. The filtering unit includes an inlet tube for introducing the hydrogen gas containing traces of impurities, a filter element made of palladium or an alloy thereof, and an outlet tube through which the purified gas is delivered, with all three parts nested together in unbonded metal-to-metal pressure seals. Since none of the parts are bonded, they are easily assembled and disassembled when in need of replacement.

In the drawing:

FIG. 2 is a sectional view of a mounting block for housing the elements of the gas purifying device;

FIG. 4 is a sectional view of a thermal switch; and

FIG. 5 is a schematic circuit showing electrical connections between the heater, the switch, and an indicator lamp.

Figure 1:
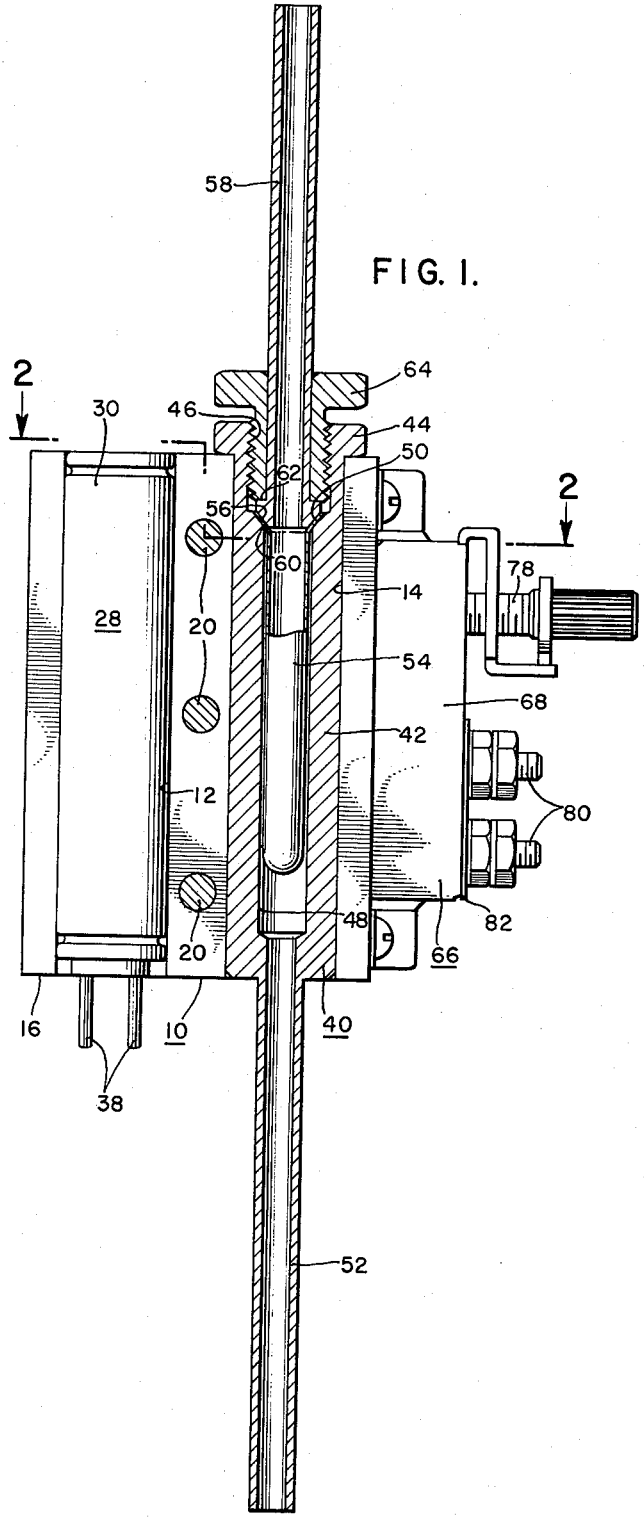
FIG. 1 is a top plan view, partly in section of a hydrogen gas purifying device constructed according to the invention.

Referring to FIGS. 1 and 2, a hydrogen purifying device comprises a thermally conducting mounting block 10 formed with a pair of spaced apart cylindrical cavities 12 and 14. The mounting block 10 is formed in two parts 16 and 18 which are held together by means of machine screws 20 extending through the two parts 16 and 18.

The outer surfaces of the mounting block 10 and the inner surfaces of the cavities 12 and 14 are provided with thin electrically insulating coatings 22, 24, and 26. The coatings 22, 24, and 26 serve as protection against electrical breakdown of the various components of the device when it is used in environments where high electrical voltages are present, for example in high temperature plasma work. When the mounting block 10 is made of aluminum or an alloy thereof, such insulating coatings may be formed by an anodizing process to form coatings of aluminum oxide.

Figure 3:
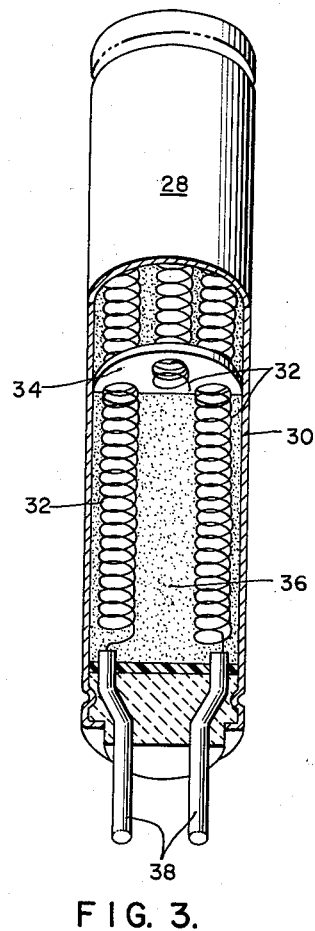
FIG. 3 is a perspective view, with portions removed, of a heater unit.

One of the cavities 12 houses a cartridge type heater unit 28. As shown more clearly in FIG. 3, the heater unit 28 includes an outer sheath 30, for example, of stainless steel, enclosing a plurality of circumferentially disposed heater elements 32 supported on ceramic discs 34, one of which is shown. The heater elements 32 are electrically insulated from each other and from the sheath 30 by means of a packing of insulation material 36 such as magnesium oxide. Connections to the heater elements 32 are made through a pair of terminals 38 extending from one end of the heater unit 28.

Referring again to FIG. 1, the other cavity 14 houses a filter unit 40. The filter unit 40 includes a tubular body member 42 provided at one end with a flange 44 which rests on an end surface of the mounting block 10. The outer surface of the body member 42 fits rather snugly within the cavity 14 for good thermal exchange between the mounting block 10 and the body member 42. The flanged end of the body member 42 is formed with a large diameter internally threaded portion 46. The central portion of the body member 42 is formed with a long, cylindrical, smooth bore 48 of smaller diameter than the threaded portion 46. The threaded portion 46 and the bore 48 are joined by a tapered annular surface 50. A relatively small diameter inlet tube 52 extends from the other end of the body member 42 so as to protrude from the mounting block 10.

A filter tube 54 is disposed within the cylindrical bore 48. The filter tube 54 has a tapered opening 56 resting on the tapered surface 50 of the body member 42 and is closed at its opposite end. The filter tube 54 may be made of palladium or an alloy containing 30% silver and 70% palladium. The alloy is preferred over the pure palladium since it provides a higher rate of diffusion of hydrogen. Furthermore, the silver-palladium alloy overcomes one disadvantage of pure palladium in that alternate heating and cooling of the palladium in the presence of hydrogen causes a repeated transition back and forth between the alpha and beta crystalline phases. This repeated transition from one phase to the other disrupts the grain structure of the palladium, thereby permitting other gases to pass through it. The palladium-silver alloy does not exhibit this phase transition, and consequently does not break down.

An outlet tube 58 fits into the tapered opening 56 of the filter tube 54. The outlet tube 58 has a beveled end 60 which rests on the tapered opening 56 of the filter tube 54. The beveled end 60, the tapered opening 56 and the tapered surface 50 all have the same amount of taper. The main body of the outlet tube 58 extends outside of the mounting block 10. A shoulder 62 is formed where the main body of the outlet tube 58 meets the beveled end 60. The outlet tube 58, the filter tube 54, and the body member 42 are brought into gas tight, pressure sealing engagement at the tapered surfaces (beveled end 60, tapered opening 56, and tapered surface 50) by means of an externally threaded nut 64 which screws into the threaded portion 46 of the body member 42 and onto the shoulder 62 of the outlet tube 58. The relatively soft metal of the palladium or palladium-silver alloy of the filter tube 54 serves to seal the joint between the relatively harder material of the outlet tube 58 and body member 42.

The body member 42 and the outlet tube 58 are made from a material having a thermal coefficient of expansion matching that of the filter tube 54 material. For example, when the filter tube 54 is made of palladium or the palladium-silver alloy, the body member 42 and the outlet tube 58 may each be made of Inconel, an alloy containing 80% nickel, 15% chromium, and 5% iron.

When assembled, the heater unit 28 and the body member 42 are held rigidly between the two parts 16 and 18 of the mounting block 10 by means of the machine screws 20, while the removable parts of the filter unit 40, namely the filter tube 54 and the outlet tube 58 are pressure sealed with the body member 42 by means of the threaded nut 64.

To maintain the purifying device at the desired operating temperature, a thermal switch 66 is mounted on the side of the mounting block 10 adjacent to the filter unit 40. As shown in FIG. 4, the thermal switch comprises a high thermal expansion metal case 68 on the bottom of which a low thermal expansion strut 70 is welded at each end. An increase in temperature causes the case 68 to expand, while the strut 70 remains the same length, thereby resulting in a downward motion of the nonexpanding strut 70. A ceramic button 72 mounted on the nonexpanding strut 70 normally holds a pair of contacts 74 supported on two spring-biased supporting members 76 in a closed position. The contact supporting members 76 are spring-biased by means of an adjusting screw 78, the bias being adjustable to provide different temperatures of operation. The motion of the nonexpanding strut 70 permits the contacts 74 to break when the required temperature is reached. Electrical connections to the spring contacts 74 are made through a pair of terminal binding posts 80 which are insulated from the case 68 by insulation material 82.

As shown schematically in FIG. 5, the thermal switch 66 may be connected electrically in series with the heater unit 28 across a power source 84, which, for example, may be a 110 volt-60 cycle power supply, or another suitable supply. An indicator lamp 86 may be connected in parallel across the heater unit 28 so that while the thermal switch 66 is closed and the heater unit 28 is receiving power the indicator lamp 86 is lit. The lamp 86 will go out when the thermal switch 66 opens to cut off power to the heater unit 28.

In operation, the inlet tube 52 is connected to a source, not shown, of hydrogen gas to be purified and the outlet tube 58 is connected to a utilization device, not shown, to which the purified hydrogen is to be delivered. Generally, the hydrogen supply contains traces of impurities such as argon, nitrogen, helium and oxygen which must be removed. Prior to the introduction of the hydrogen, however, tubes 52 and 58 are evacuated by means of a vacuum pump, and then the heater unit 28 is energized to bring the purifying device up to the desired temperature of operation. The heat generated in the heater unit 28 is quickly conducted through the mounting block 10 to the filter unit 40 to raise the temperature of the filter tube 54 to the desired temperature. In practicing the invention it is preferred to operate in the range of from 600° to 610° F. When the desired operating temperature has been reached, as will be indicated by the indicator lamp 86 shutting off, the hydrogen gas is admitted to the inlet tube 52. In high temperature plasma work it has been found desirable to introduce the hydrogen at a pressure at about 3 pounds per square inch. The outlet tube 58 through which the purified hydrogen passes is maintained at a base pressure of about $1 \times 10^{-6}$ millimeters of mercury.

With the filter tube 54 raised to a temperature of about 600° to 610° F. only pure hydrogen will be drawn from the inlet tube 52 through the filter tube 54 and out of the outlet tube 58, with the gaseous impurities being blocked by the filter tube 54. It is pointed out that the rate of diffusion of the hydrogen is proportional to the over-all area of the filter tube 54. Thus the length and diameter of the tube 54 may be adjusted to provide a desired rate of diffusion. In one operative embodiment, a filter tube 54 constructed with a length of 2 inches, a diameter of .250 inch and a wall thickness of .010 inch gave a satisfactory rate of diffusion for the use of hydrogen in the study of high temperature gaseous phenomena.

It is readily apparent that the independent mounting of the heater and filter units 28 and 40 in the mounting block 10 facilitates the replacement of either unit without dismantling the other and without disconnecting the device from the vacuum system. When the filter tube 54 needs replacement it is merely necessary to unscrew the threaded nut 64, remove the outlet tube 58 and then remove and replace the filter tube 54. This can be done by merely closing a valve connecting the outlet tube 58 with the vacuum system.

Another feature of the hydrogen purifying device is the pressure seal set up between the inlet tube 52, filter tube 54, and outlet tube 58. Since these parts are made of materials which have matching thermal coefficients of expansion, a vacuum tight seal is maintained at all times under changing temperature conditions.

The embodiments of the invention in which an exclusive property or privilege is claimed are defined as follows:

1. A hydrogen purifying device, comprising: a mounting block of thermally conducting material provided with a pair of spaced apart elongated cavities; a cartridge type heater means removably disposed in one of said cavities; a filter unit removably disposed in the other of said cavities, said filter unit including a tubular body member extending along said other cavity, one end of said body member being provided with a flange resting on one surface of said mounting block and being formed with a large diameter internally threaded portion, said body member including a central portion formed with a long, cylindrical smooth bore of smaller diameter than said threaded portion, a tapered annular surface joining said threaded portion and said central portion, and an inlet tube joined to said central portion and protruding from another surface of said mounting block; a tubular filter element made of palladium-silver alloy disposed within said cylindrical bore, said filter element having a tapered opening adjacent to said tapered surface and being closed at its other end adjacent to said inlet tube; an outlet tube having a beveled end resting on the tapered opening of said filter element and having its opposite end protruding beyond said mounting block, the main body of said outlet tube forming a shoulder with said beveled end, and an externally threaded nut engaging said threaded body member portion and provided with a central opening through which said outlet tube extends, said nut being movable to engage the shoulder of said outlet tube and force said beveled end of said outlet tube, said tapered opening of said filter element, and said tapered annular surface of said body member into gas tight sealing engagement, said outlet tube and said body member being made from material having a thermal expansion coefficient matching that of said filter element.

2. The invention according to claim 1, wherein the outer surfaces of said mounting block and the inner surfaces forming said cavities are provided with electrical insulation coatings.

References Cited in the file of this patent
UNITED STATES PATENTS

| | | |
|---|---|---|
| 2,456,163 | Watson | Dec. 14, 1948 |
| 2,536,610 | King et al. | Jan. 2, 1951 |
| 2,671,337 | Hulsberg | Mar. 9, 1954 |
| 2,911,057 | Green et al. | Nov. 3, 1959 |
| 2,958,391 | De Rosset | Nov. 1, 1960 |
| 3,019,853 | Kohman et al. | Feb. 6, 1962 |